United States Patent
Quertelet

(10) Patent No.: US 9,891,031 B2
(45) Date of Patent: Feb. 13, 2018

(54) MISSILE STRUCTURAL WALL FOR THERMAL PROTECTION FAIRING

(71) Applicant: MBDA FRANCE, Le Plessis-Robinson (FR)

(72) Inventor: Clément Quertelet, Paris (FR)

(73) Assignee: MBDA FRANCE, Le Plessis-Robinson (FR)

( * ) Notice: Subject to any disclaimer, the term of this patent is extended or adjusted under 35 U.S.C. 154(b) by 0 days.

(21) Appl. No.: 15/320,064

(22) PCT Filed: Jun. 10, 2015

(86) PCT No.: PCT/FR2015/000115
§ 371 (c)(1),
(2) Date: Dec. 20, 2016

(87) PCT Pub. No.: WO2015/197923
PCT Pub. Date: Dec. 30, 2015

(65) Prior Publication Data
US 2017/0167838 A1 Jun. 15, 2017

(30) Foreign Application Priority Data
Jun. 25, 2014 (FR) ..................... 14 01422

(51) Int. Cl.
*F42B 15/34* (2006.01)
*F42B 10/46* (2006.01)
*B64G 1/58* (2006.01)

(52) U.S. Cl.
CPC ............... *F42B 15/34* (2013.01); *B64G 1/58* (2013.01); *F42B 10/46* (2013.01)

(58) Field of Classification Search
CPC ............. F42B 15/34; F42B 10/46; B64G 1/58
USPC ...... 102/374, 377, 378, 293; 244/171.7, 121; 428/920
See application file for complete search history.

(56) References Cited

U.S. PATENT DOCUMENTS

| | | | | |
|---|---|---|---|---|
| 4,428,998 A | * | 1/1984 | Hawkinson | B32B 5/26 220/900 |
| 4,892,783 A | * | 1/1990 | Brazel | B32B 18/00 427/402 |
| 5,413,859 A | | 5/1995 | Black et al. | |

(Continued)

FOREIGN PATENT DOCUMENTS

DE    202014 00313 U1 * 7/2014 ............. F24B 15/34

OTHER PUBLICATIONS

ISA/EP International Search Report dated Sep. 7, 2015 re PCT Application No. PCT/FR2015/000115, filed Jun. 10, 2015.

*Primary Examiner* — James S Bergin
(74) *Attorney, Agent, or Firm* — Patrick J. Daugherty; Driggs, Hogg, Daugherty & Del Zoppo Co., LPA

(57) ABSTRACT

The invention relates to a missile structural wall, in particular for a thermal protection fairing. The structural wall of a missile, in particular of a protective fairing of the missile, comprises a structural part provided with an outer surface and an inner surface, as well as comprising, at least at a front end of the structural part, an outer thermal protection layer on the outer surface and an inner thermal protection layer on the inner surface, the inner layer being made from a material having a density that is between 2 and 20 times lower than that of the material of the outer layer.

20 Claims, 2 Drawing Sheets

(56) References Cited

U.S. PATENT DOCUMENTS

| | | | |
|---|---|---|---|
| 5,824,404 A * | 10/1998 | Brown | F42B 12/76 |
| | | | 257/625 |
| 5,979,826 A | 11/1999 | Brown et al. | |
| 6,091,375 A | 7/2000 | Goto et al. | |
| 6,558,785 B1 | 5/2003 | Rawal et al. | |
| 6,592,981 B1 | 7/2003 | Rawal et al. | |
| 7,118,802 B2 * | 10/2006 | Simon | B32B 18/00 |
| | | | 422/178 |
| 7,710,347 B2 * | 5/2010 | Gentilman | B28B 1/00 |
| | | | 343/705 |

* cited by examiner

MISSILE STRUCTURAL WALL FOR THERMAL PROTECTION FAIRING

BACKGROUND

The present invention relates to a structuring wall of a missile.

BRIEF DESCRIPTION OF THE DRAWINGS

These and other features of embodiments of the present invention will be more readily understood from the following detailed description of the various aspects of the invention taken in conjunction with the accompanying drawings.

The accompanying drawings will give a clear understanding as to how the invention can be implemented. In these drawings, identical references denote similar elements.

DETAILED DESCRIPTION

Figure 1:
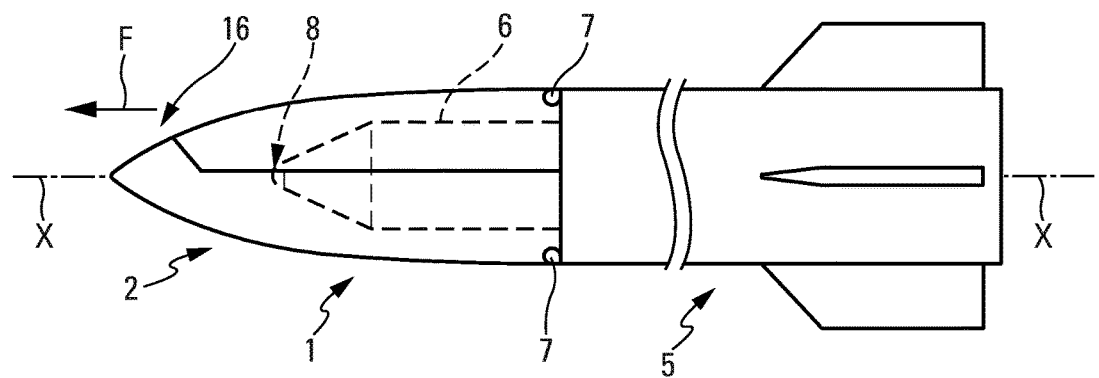
FIGS. 1 and 2 schematically show an example missile, on which a protective fairing according to the present invention is applied, in a fitted position on the missile and in a jettisoned or open position, respectively.

This structuring wall is more particularly, though not exclusively, a missile thermal protection fairing which is intended to be mounted on the front of a missile, and said wall is described more specifically in terms of a protective fairing of this kind. However, the invention can be applied to different wall parts of a missile, in particular on the structuring body thereof, namely any structuring wall that is subjected to significant thermal or aerothermodynamic flow.

Furthermore, the present invention can apply in particular to a missile comprising at least one jettisonable propulsion stage and a terminal vehicle which is arranged on the front of the propulsion stage. Generally, a terminal vehicle of this kind comprises, in particular, a sensor which forms, for example, part of a homing device and is likely to be temperature-sensitive.

The present invention is therefore applicable more particularly, although not exclusively, to a missile having a flight envelope that remains within the atmosphere and the kinetic performance of which enables the terminal vehicle to be brought to hypersonic speeds. At these high speeds, the surface temperature of the missile can reach several hundred degrees Celsius under the effect of aerothermodynamic flow, which can be detrimental to the resistance and the performance of the structures and of the electronic equipment and in particular of the on-board sensors. For this reason, it is necessary to provide a protective fairing.

Owing to the significant dynamic and kinetic capabilities of the missile, the protective fairing has to be capable of withstanding not only high temperatures, but also significant mechanical stresses. Furthermore, at least one device which is arranged inside the fairing and is intended to open the fairing has to also be protected from thermal flows that might be transmitted by the fairing on which said device is fastened.

A solution consists in covering the structural part of the fairing wall, on the outside, with an extensive and thick thermal protection layer so as to thermally protect the inside of the fairing and in particular the terminal vehicle, but also so as to keep the structuring material of the fairing (structural part) at a relatively low temperature (so that said material does not lose its mechanical features).

However, owing to the fact that a thick layer of this kind has to have thermal protection features and also mechanical protection features, said layer has a large mass, and this is detrimental to the performance of the missile.

Furthermore, U.S. Pat. No. 5,979,826 discloses a structuring wall, in particular for a missile, comprising protective layers.

The present invention relates to a missile structuring wall, in particular a protective fairing for the missile, which is intended to remedy the aforementioned drawback.

For this purpose, according to the invention, said structuring wall, which comprises a structural part provided with an outer surface and an inner surface, is characterised in that it further comprises, at least in a portion of the structural part:

at least one outer thermal protection layer on the outer surface of the structural part; and at least one inner thermal protection layer on the inner surface of the structural part, and in that the inner layer is made of a material having a density that is between 2 and 20 times lower than that of the material of the outer layer.

Therefore, by virtue of the invention:

the outer layer, which is advantageously designed to also provide mechanical protection and has a high density, has a reduced mass as a result of having a reduced thickness; and the inner layer makes it possible to compensate for the reduction in thermal protection caused by the reduction in the thickness of the outer layer, thus making it possible to prevent or at least significantly reduce detrimental heat transfer from the structural part to equipment inside the wall. For example, in the case of a wall of a thermal protection fairing, the invention makes it possible to reduce detrimental heat transfer to a sensor of a terminal vehicle or a device for opening the protective fairing and ejecting the terminal vehicle.

Therefore, this new wall structure does not reduce the performance of the missile, the inner portions of which are protected thermally (by the combination of the outer and inner layers) and mechanically (by means of the structural part and as a result of the outer layer contributing to the mechanical strength).

Moreover, owing to the very low density of the material of the inner thermal protection layer, which has a reduced mass, a fairing wall is produced having at least three layers (outer layer, structural part, inner layer), the overall mass of which is much lower than that of a fairing of the aforementioned type which comprises, in addition to the structural part, a thick (and heavy) outer protection. A more effective assembly is thus produced.

Therefore, in the context of the present invention, rather than seeking to reach a relatively low temperature of the structural part, a higher temperature thereof is tolerated by providing a much thinner outer layer, but while simultaneously preventing, by means of the inner layer, the onset of adverse effects on the equipment.

In a preferred embodiment:

the outer layer comprises a silicone-based or graphite-based material provided with integrated elements (fibres, fabrics, etc.); and/or the inner layer comprises a fibrous material; and/or the structural part is made of one of the following materials: a metal material, a thermostructural composite material or a ceramic material.

In addition, in a particular embodiment, the structuring wall, preferably of a protective fairing, comprises at least two shells which are interconnected in connection (or junction) regions, the outer layer also covers said outer surface in said connection regions and the inner layer releases said connection regions on said inner surface.

Therefore, the structuring wall is provided with thermal protection which covers the free edges (in connection regions) on the outside, and this contributes to keeping the structuring wall sealed. The outer thermal protection layer is torn at the connection regions when the shells are separated, for example when the fairing is being jettisoned or opened.

Moreover, the structuring wall, preferably of a protective fairing, advantageously comprises at least one inner component, for example a pyrotechnic actuator, which is connected by at least one of its ends to the structural part. The inner component is connected to the inner surface of the structural part by means of a thermal protection interface element via an opening provided in the inner layer. The interface element is preferably made of the same material as the outer layer.

It is noted that it is not appropriate for the inner components, such as pyrotechnic actuators for example, to be directly connected to the structural part of the wall (in particular of a fairing wall) because the temperature (above 200° C. for example) is likely to impair the operation of the pyrotechnic actuator or even trigger said actuator at the incorrect time.

Moreover, in a first embodiment, said outer and inner layers are arranged over the whole of said structural part, and this makes it possible to protect a protective fairing, for example, in a comprehensive manner.

Additionally, in a second embodiment, said outer and inner layers are arranged only on a portion (preferably the front end in the case of a protective fairing) of the structural part, and this makes it possible to reduce the mass of the structuring wall, while also protecting the hottest regions, for example the nose of the protective fairing. In this second embodiment, the structural part is advantageously made of a thermostructural composite material or a ceramic material which offers high thermal protection.

In a particular embodiment, the structuring wall is therefore the wall of a thermal protection fairing which is intended to be mounted on the front of the missile.

The present invention also relates to a missile which comprises the structuring wall, and in particular a protective fairing, such as those described above.

Figure 2:
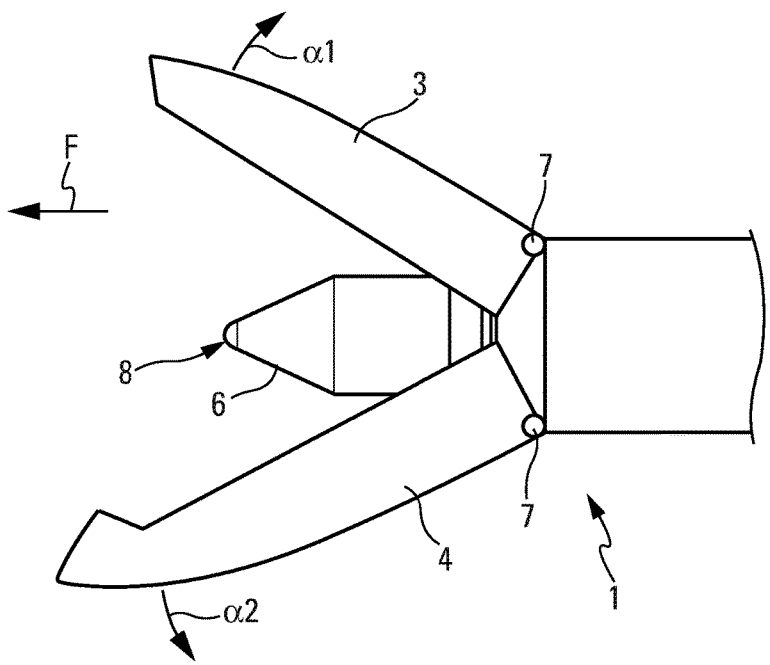

The present invention relates to a missile 1 shown schematically in FIGS. 1 and 2, and relates to a structuring wall 10 of the missile 1.

This structuring wall can correspond to any wall part of the missile 1 which has to be protected, in particular thermally and also mechanically. In a preferred but non-limiting manner, the invention is described below with reference to a wall 10 of a protective fairing 2.

This protective fairing 2 is arranged at the front of the missile 1 (in the movement direction F of said missile 1). This protective fairing 2 comprises a plurality of shells 3 and 4, in this case two shells 3 and 4 in the example shown in FIGS. 1 and 2.

In FIGS. 1 and 2, the invention is applied to a missile 1 which has a longitudinal axis X-X and comprises at least one jettisonable propulsion stage 5 (to the rear) and a terminal vehicle 6 that is arranged at the front (in the movement direction F) of this propulsion stage 5.

In general, a flying terminal vehicle 6 of this kind comprises, in particular, at least one sensor 8 which is arranged at the front, forms, for example, part of a homing device and is likely to be temperature-sensitive. The propulsion stage 5 and the terminal vehicle 6, which can be of any standard type, are not described any further in the description that follows.

Usually, the propulsion stage(s) 5 of a missile 1 of this kind are intended for the propulsion of said missile 1, from firing until a target (that has to be neutralised by the missile 1) is close. The terminal phase of the flight is completed autonomously by the terminal vehicle 6, which uses in particular information originating from the on-board sensor 8, for example an optoelectronic sensor intended to assist in detecting the target. In order to do this, the terminal vehicle 6 comprises all the standard means (not described any further) which are necessary for performing this terminal flight. Before the terminal phase is started, the protective fairing 2 is jettisoned (or at least opened), after separation of the different shells 3 and 4, for example by pivoting, in order to release the (flying) terminal vehicle 6 that then separates from the rest of the missile 1.

In the situation shown in FIG. 1, the protective fairing 2 is mounted on the missile 1 in an operating (or protection) position. The terminal vehicle 6 mounted inside the protective fairing 2 is represented by broken lines.

In addition, in the situation shown in FIG. 2, the shells 3 and 4 are in the process of separating, for example by being pivoted by means of hinge (or rotary) elements 7 shown schematically in FIG. 2, as illustrated by arrows α1 and α2, respectively, during a phase of opening or of jettisoning the protective fairing 2. This phase of opening or jettisoning the protective fairing 2 allows the release of the terminal vehicle 6, which can for example be ejected out of the missile 1 using appropriate ejection means (not shown).

The present invention can be applied more particularly, although not exclusively, to a missile 1 having a flight envelope which remains in the atmosphere and which has kinetic performances that allow the terminal vehicle 6 to be brought to hypersonic speeds. At these high speeds, the surface temperature of the missile 1 can reach several hundred degrees Celsius under the effect of aerothermodynamic flow, which makes it necessary to provide a protective fairing 2 which is efficient in making possible the resistance and the performances of the structures and of the electronic equipment and in particular of the on-board sensors.

Figure 3:
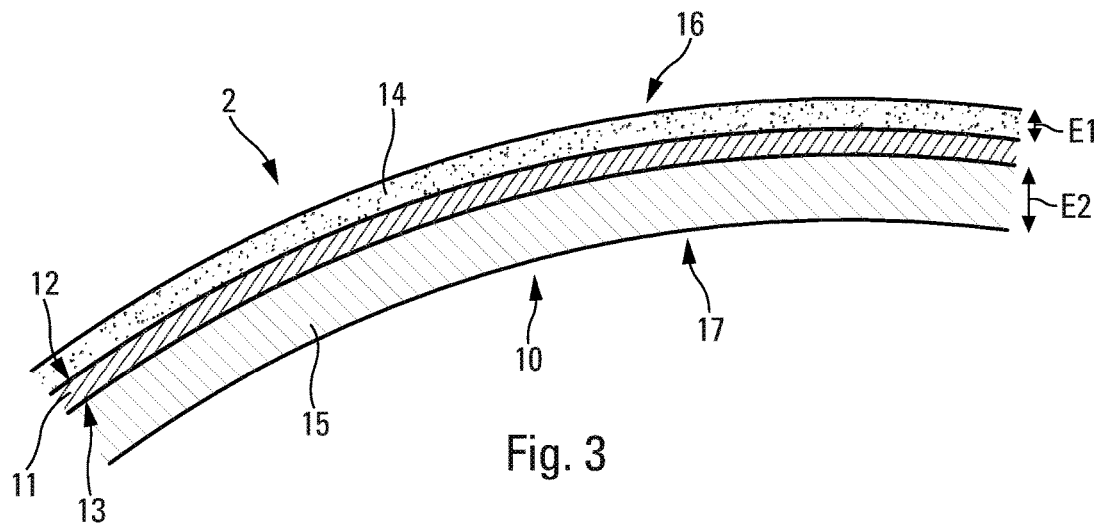
FIG. 3 is a schematic section of a portion of a protective fairing wall.

The protective fairing 2, which is intended to be mounted on the front of the missile 1 in order to cover the terminal vehicle 6 at least in part, preferably completely, comprises a wall 10 provided with a structural part (or layer) 11, as shown in FIG. 3. FIG. 3 is a cross section of a portion of the wall 10 along the axis X-X (for example in a plane P shown in FIG. 4A).

This structural part 11 has an outer surface 12 and an inner surface 13, which are defined with respect to the outside and to the inside, respectively, of the missile 1 (or the longitudinal axis X-X of the missile 1).

According to the invention, the wall 10 further comprises, at least at a front end (or portion) 16 of the structural part 11:

an outer thermal protection layer 14 on the outer surface 12 of the structural part 11; and an inner thermal protection layer 15 on the inner surface 13 of the structural part 11.

Moreover, according to the invention, the inner layer 15 is made of a material having a density that is between 2 and 20 times lower than the density of the material of the outer layer 14.

Therefore, the wall 10 comprises, in addition to the structural part 11, an outer thermal protection layer 14 which is combined with an inner thermal protection layer 15. More specifically:

the outer layer 14, which is designed to also provide mechanical protection and has a high density for this purpose, has a reduced mass as a result of having a reduced thickness E1; and the inner layer 15 makes it possible to compensate for the reduction in thermal protection caused by the reduction in the thickness of the outer layer 14, thus making it possible to prevent or at least significantly reduce detrimental heat transfer from the structural part 11 to equipment inside the protective fairing 2, and in particular to the sensor 8 of the terminal vehicle 6.

Therefore, this structure of the wall 10 does not reduce the performances of the missile 1, the inside 17 of which is thermally protected (by the combination of the outer layer 14 and the inner layer 15). The wall 10 is also protected mechanically by means of the structural part 11, the outer layer 14 also contributing to this mechanical protection.

Moreover, owing to the very low density of the material of the inner thermal protection layer 15, which has a reduced mass, the wall 10 of the protective fairing 2 having at least three layers (outer layer 14, structural part 11, inner layer 15) has an overall mass which is much lower than that of a fairing comprising a typical outer protection means which is thick and heavy. A lighter protective fairing 2 and thus a more effective missile 1 is therefore produced.

Therefore, in the context of the present invention, rather than seeking to reach a relatively low temperature of the structural part 11, a higher temperature thereof is tolerated by providing a much thinner outer layer 14, but while simultaneously preventing, by means of the inner layer 15, corresponding adverse effects on the equipment.

Figure 4A:
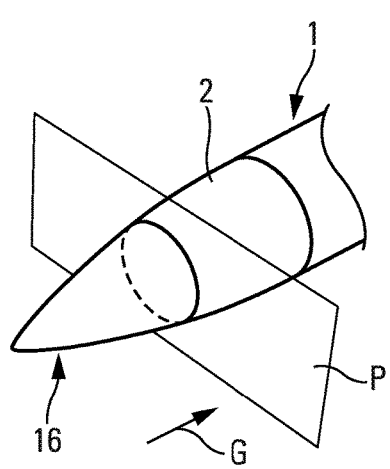
FIG. 4B is a view of example shell connection regions in a plane shown schematically in FIG. 4A.
Figure 4B:
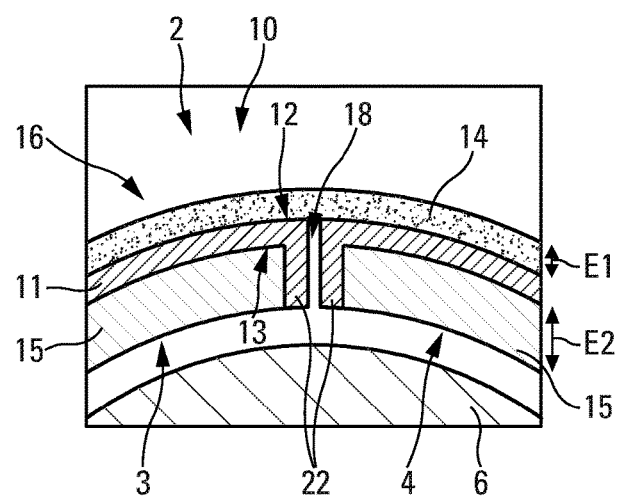

Moreover, in the particular embodiment shown in FIGS. 3 and 4B in particular, the outer layer 14 has a reduced thickness E1 that is less than the thickness E2 of the inner layer 15.

In a particular embodiment:

the outer layer 14 comprises a silicone-based material which may contain short fibres (carbon, glass, silica, aramid) or fabric (carbon, glass, silica, aramid). Said outer layer can also be made from graphite, phenolic resin or other standard materials; and the inner layer 15 comprises a fibrous material, for example silica wool, silica felt, magnesium silicate fibres, RCFs (refractory ceramic fibres), aluminium silicate fibres, polycrystalline fibres, etc. The inner layer 15 can be supplemented by a restraint fabric or can comprise a sandwich material comprising a plurality of insulators.

Such materials for the inner layer 15 have a considerable advantage over the outer thermal protection materials, namely a density of less than 0.5 (approximately two to twenty times less dense than the aforementioned materials for the outer layer 14). Conversely, these materials for the inner layer 15 do not have any mechanical strength, but this is not a problem because they are used inside the protective fairing 2.

Moreover, the structural part 11 can be made of one of the following materials:

a metal material, such as high-performance steels (X4, X5, etc.) or titanium alloys (for example Ti6Al4V); or a thermostructural composite material, in particular of the CMC type (ceramic matrix composite); or a ceramic material (silicon carbide, etc.).

Furthermore, in a particular embodiment, as shown in FIG. 4B, which is a partial view, in the direction of the arrow G, of the transverse plane P shown in FIG. 4A, the two shells 3 and 4 are interconnected in connection (or junction) regions, such as the connection region 18. In this particular embodiment:

the outer layer 14 also covers said outer surface 12 in the connection region 18 (defined by two radial edges 22 of the structural part); and the inner layer 15 releases the connection region 18 on said inner surface 13, by stopping at the radial edges 22.

Therefore, the protective fairing 2 is provided with thermal protection which covers the free edges (in connection regions 18) on the outside 16, and this contributes to keeping the fairing sealed. The outer thermal protection layer 14 is torn at the connection regions 18 when the shells 3 and 4 are separated when the protective fairing 2 is being jettisoned or opened.

This solution prevents there from being an opening in the connection region 18 which would let in the aerothermodynamic flow (capable of causing the on-board equipment and in particular the sensor 8 to heat up in a detrimental manner before the fairing is removed).

In a particular embodiment (not shown), an inner covering for the inner layers of two adjacent shells can be provided. Furthermore, in this case, the outer layer can be cut in advance to facilitate tearing thereof.

Figure 5:
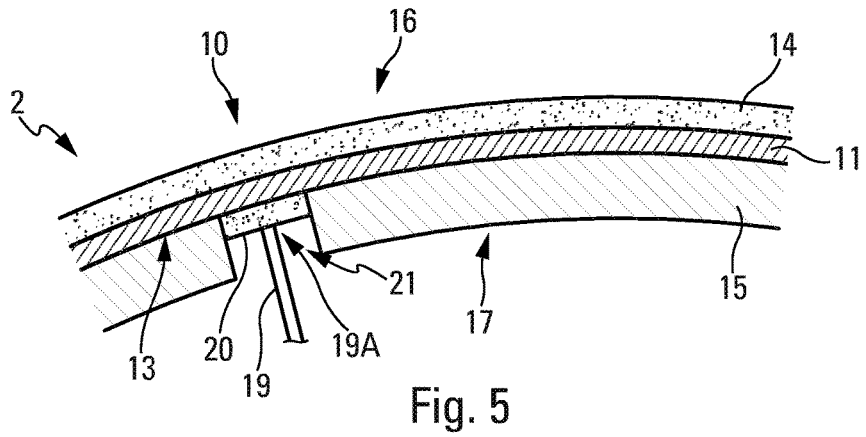
FIG. 5 shows the arrangement of a thermal protection interface element.

Moreover, the protective fairing 2 comprises at least one inner component 19, for example a pyrotechnic actuator or some kind of electronic equipment, which is connected by at least one 19A of its ends to the structural part 11. The inner component 19 is connected to the inner surface 13 of the structural part 11 by means of a thermal protection interface element 20, in particular in the form of a sole plate, via an opening 21 provided in the inner layer 15, as shown in FIG. 5.

In a preferred embodiment, the interface element 20 is made of the same material as the outer layer 14, for example a silicone material. The interface element 20 can also be made of an insulating ceramic material, such as silicon nitride, mullite, zircon, etc.

In a particular embodiment, the protective fairing 2 comprises a plurality of inner components 19 of this kind.

It is noted that it is not appropriate for an inner component 19, such as a pyrotechnic actuator, to be directly connected to the structural part 11 of the protective fairing 2 because the temperature is likely to impair the operation of the pyrotechnic actuator or even trigger said actuator at the incorrect time.

Moreover, in a first embodiment, said outer and inner layers 14, 15 are arranged over the whole of said structural part 11, and this makes it possible to protect the whole of the fairing 2 in a comprehensive manner.

Additionally, in a second embodiment, said outer and inner layers 14, 15 are arranged only on a front portion or end of the structural part 11, only at the nose, and this makes it possible to reduce the mass of the protective fairing 2, while also protecting the hottest regions. In this second embodiment, the structural part 11 is preferably made of a ceramic matrix composite material which offers high thermal protection and thus thermally protects in particular the part(s) that are not provided with layers 14 and 15.

Therefore, in the context of the present invention, a thinner outer thermal protection layer 14 is used in order for the structuring material (structural part 11) to function at a higher temperature. The outer layer sustains slight loss of its properties, but this is limited. Conversely, since the inner surface 13 is hotter (by several hundred degrees), it is covered by the inner thermal protection layer 15 so as to protect the inside 17 and in particular the terminal vehicle 6 from radiation and convective effects.

Therefore, the protective fairing 2 has internal thermal protection which prevents heat transfer that is detrimental for the structures, the on-board equipment, and in particular the sensor 8 of the terminal vehicle 6. The present invention can apply to any type of missile provided with a protective fairing 2. Therefore, in particular, said invention is not limited by the missile range and whether or not said missile comprises stages, and said invention does not depend on the flight altitude.

The invention claimed is:

1. A missile structuring wall, comprising:
   a structural part comprising an outer surface and an inner surface; and
   at least a portion of the structural part comprising:
   at least one outer thermal protection layer on the outer surface of the structural part; and
   at least one inner thermal protection layer on the inner surface of the structural part; and
   wherein the inner layer is formed from a material having a density that is between 2 and 20 times lower than that of a density of a material of the outer layer.

2. The wall according to claim 1, wherein the outer layer comprises:
   integrated elements; and
   a material that is selected from the group consisting of a silicone-based material and a graphite-based material.

3. The wall according to claim 1, wherein the outer layer is configured to provide mechanical protection.

4. The wall according to claim 1, wherein the inner layer comprises a fibrous material.

5. The wall according to claim 1, wherein the structural part is formed from a material that is selected from the group consisting of a metal material, a thermostructural composite material and a ceramic material.

6. The wall according to claim 1, further comprising:
   at least two shells that are interconnected in connection regions; and
   wherein said outer layer also covers said outer surface in said connection regions, and inner layer releases on said connection regions on said inner surface.

7. The wall according to claim 1, further comprising:
   at least one inner component which is connected by at least one of its ends to the structural part, said inner component being connected to the inner surface of the structural part by means of a thermal protection interface element via an opening provided in the inner layer.

8. The wall according to claim 7, wherein the interface element is formed from a same material as the outer layer.

9. The wall according claim 1, wherein said outer and inner layers are arranged over a whole of said structural part.

10. The wall according to claim 1, wherein said outer and inner layers are arranged only on a portion of the structural part.

11. The wall according to claim 10, wherein that the structural part is formed from a material that is selected from the group consisting of a thermostructural composite material and a ceramic material.

12. The wall according to claim 1, wherein the wall forms a protective fairing configured for mounting on a front of the missile.

13. A missile, comprising:
    a structuring wall, comprising:
    a structural part comprising an outer surface and an inner surface; and
    at least a portion of the structural part comprising:
    at least one outer thermal protection layer on the outer surface of the structural part; and
    at least one inner thermal protection layer on the inner surface of the structural part; and
    wherein the inner layer is formed from a material having a density that is between 2 and 20 times lower than that of a density of a material of the outer layer.

14. The missile according to claim 13, wherein the outer layer comprises:
    integrated elements; and
    a material that is selected from the group consisting of a silicone-based material and a graphite-based material.

15. The missile according to claim 13, wherein the outer layer is configured to provide mechanical protection.

16. The missile according to claim 13, wherein the inner layer comprises a fibrous material.

17. The missile according to claim 13, wherein the structural part is formed from a material that is selected from the group consisting of a metal material, a thermostructural composite material and a ceramic material.

18. The missile according to claim 13, further comprising:
    at least two shells that are interconnected in connection regions; and
    wherein said outer layer also covers said outer surface in said connection regions, and inner layer releases on said connection regions on said inner surface.

19. The missile according to claim 13, further comprising:
    at least one inner component which is connected by at least one of its ends to the structural part, said inner component being connected to the inner surface of the structural part by means of a thermal protection interface element via an opening provided in the inner layer.

20. The missile according to claim 19, wherein the interface element is formed from a same material as the outer layer.

* * * * *